United States Patent
Higashino (10) Patent No.: US 6,522,393 B2
(45) Date of Patent: Feb. 18, 2003

(54) DISTANCE MEASURING DEVICE

(75) Inventor: Fuminobu Higashino, Saitama-ken (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 09/845,212

(22) Filed: May 1, 2001

(65) Prior Publication Data

US 2002/0135747 A1 Sep. 26, 2002

(30) Foreign Application Priority Data

May 1, 2000 (JP) ........................................ 2000-131939

(51) Int. Cl.$^7$ ............................. G01C 3/00; G01C 3/08; G01C 5/00; G03B 13/00; G03B 3/00; G03B 15/02
(52) U.S. Cl. ..................... 356/3.03; 356/3.06; 396/104; 396/106
(58) Field of Search ............................ 356/3.01–5.15; 396/106, 103, 104, 108

(56) References Cited

U.S. PATENT DOCUMENTS

| | | | | |
|---|---|---|---|---|
| 4,592,638 A | * | 6/1986 | Kaneda et al. ............... 354/403 |
| 4,818,865 A | | 4/1989 | Matsui et al. |
| 4,947,202 A | | 8/1990 | Kitajima et al. |
| 4,992,817 A | | 2/1991 | Aoyama et al. |
| 5,081,344 A | * | 1/1992 | Misawa ..................... 250/201.4 |
| 5,121,153 A | | 6/1992 | Yamada et al. |
| 5,138,358 A | * | 8/1992 | Aoyama et al. ............. 354/403 |
| 5,589,910 A | * | 12/1996 | Saito et al. ................. 396/106 |
| 5,745,806 A | * | 4/1998 | Saito ......................... 396/106 |
| 5,761,549 A | * | 6/1998 | Utagawa ..................... 396/109 |
| 5,848,301 A | * | 12/1998 | Nonaka ........................ 396/56 |
| 5,864,720 A | | 1/1999 | Miyanari |
| 5,870,178 A | * | 2/1999 | Egawa et al. ............... 356/3.03 |
| 6,160,613 A | * | 12/2000 | Takasaki et al. ........... 356/3.08 |
| 6,173,122 B1 | | 1/2001 | Matsumoto et al. |
| 6,243,537 B1 | | 6/2001 | Higashino |
| 6,308,015 B1 | * | 10/2001 | Matsumoto .................. 396/106 |
| 6,323,941 B1 | * | 11/2001 | Evans et al. ................ 356/4.01 |
| 6,330,055 B1 | * | 12/2001 | Higashino .................. 356/3.06 |

FOREIGN PATENT DOCUMENTS

EP        0768543      4/1997

* cited by examiner

Primary Examiner—Thomas H. Tarcza
Assistant Examiner—Brian Andrea
(74) Attorney, Agent, or Firm—Greenblum & Bernstein, P.L.C.

(57) ABSTRACT

A distance measuring device includes a light emitting system that emits light toward an object that is subject to a distance measurement. A light receiving system is provided to receive optical images which are formed by an optical system. The light receiving system outputs data corresponding to the received images. The light receiving system is capable of receiving the object images when the light emitting system emits the light, and when the light emitting system does not emit the light. Further, the distance measuring device includes a control system that receives the data output by the light receiving system twice at the greatest, and performs distance measuring operations, which include a passive distance measurement and an active distance measurement, based on the data output by the light receiving system.

14 Claims, 9 Drawing Sheets

LIGHT EMITTED ⇩      LIGHT NOT EMITTED ⇩

MEASURING RANGE      MEASURING RANGE

10 ELEMENTS      10 ELEMENTS

DISTANCE MEASURING DEVICE

BACKGROUND OF THE INVENTION

The present invention relates to a distance measuring device, which is employed in a camera, a video camera and the like, for measuring an object distance (i.e., a distance to an object). In particular, the invention relates to a distance measuring device, which employs an active distance measuring method and a passive distance measuring method.

Conventionally, as a method for measuring a distance to an object, a passive distance measuring method and an active distance measuring method have been known and employed in cameras. The passive distance measuring method is a method in which two photo sensors having the same optical systems are used to detect the contrast of object images, and the object distance is determined based on a phase difference caused by a parallax of the object images formed on the sensors. In the passive distance measuring method, since an externally light source is used, if the object is sufficiently bright so that the object images can be detected by the sensors, the distance can be measured. However, if the object does not have sufficient contrast, or the object is relatively dark, then the accuracy of the measurement is lowered. In order to overcome this deficiency, recently, auxiliary light emitted by a light emitting element is projected to the object, and the reflected light is received to perform the passive distance measurement.

The active distance measuring method is a method in which light emitted by a light emitting element is projected to an object, and the light reflected by the object is received by a light receiving element to determine an object distance in accordance with a triangular method. In accordance with this active distance measuring method, if the object reflects the light incident thereon, then even if the object is located in a dark scene, or the object has less contrast, for example, the object has a repeated pattern on its surface, the object distance can be metered.

However, in the active distance measuring method, if the object is relatively far from the distance measuring device, since the light is attenuated, it would be difficult to measure the object distance accurately.

As described above, the passive distance measuring method and the active distance measuring method respectively have advantages and disadvantages. Therefore, it is preferable in a camera that both the passive distance measuring method and the active distance measuring method are employed so that the measurement can be performed at high precision under various photographing conditions. However, due to the differences between the active distance measuring method and the passive distance measuring method, each method should be controlled separately. Therefore, in such a camera, a period of time during which the distance measurement is performed is prolonged. For example, in the active distance measuring method, in order to improve the accuracy of the measurement, the output of the sensor when the light is not emitted is referred to as a reference output, and the output when the light is emitted is adjusted using the reference output. In order to carry out such an adjustment, it is necessary to obtain the outputs of the photo sensors when the light is emitted and when the light is not emitted.

When the passive distance measuring method is used, as described above, the measurement is performed, when the light is emitted or when the light is not emitted, based on the outputs of the photo sensors. That is, in either case, the outputs of the photo sensors should be obtained. If both the passive distance measuring method and the active distance measuring method are to be performed, a procedure for obtaining the outputs of the photo sensors is repeated. As a result, the number of steps to be taken for the distance measurement increases, which causes the period of time required for the distance measurement to be relatively long.

SUMMARY OF THE INVENTION

It is therefore an object of the invention to provide an improved distance measuring device which employs both the passive distance measuring method and the active distance measuring method without increasing the number of steps to be taken for determining the object distance.

For the above object, according to the invention, there is provided a distance measuring device, which includes a light emitting system that emits light toward an object that is subject to a distance measurement, an optical system, a light receiving system, the optical system forming object images on the light receiving system, the light receiving system outputs data corresponding to the received images, the light receiving system capable of receiving the object images either of when the light emitting system emits the light and when the light emitting system does not emit the light, a control system that receives the data output by the light receiving system twice at the greatest, the control system performing distance measuring operations, which include a passive distance measurement and an active distance measurement, based on the data output by the light receiving system.

With this configuration, both the passive distance measuring method and the active distance measuring method can be employed without increasing the number of steps to be taken for determining the object distance.

Optionally, the control system may receive the data when the light emitting system emits light as well as the data when the light emitting system does not emit light, and calculate an object distance.

Optionally, the distance measuring device may further include a storing device that stores the data received by the control system, the distance measurement calculation being executed using the data stored in the storing device.

In a particular case, the light receiving system may include three sensors, and the control device performs the passive distance measurement based on outputs of two of the three sensors when the light emitting system emits light or when the light emitting system does not emit light, and performs the active distance measurement based on outputs of the other one of the three sensors when the light emitting system emits light and when the light emitting system does not emit light.

According to another aspect of the invention, there is provided a distance measuring method, which includes obtaining first data corresponding to light reflected by an object when a predetermined light is not emitted to the object, obtaining second data corresponding to light reflected by the object when a predetermined light is emitted to the object, performing a passive distance measurement based on at least one of the first data and the second data, and performing an active distance measurement based on the first data and the second data.

Optionally, the method may further include storing the first data and the second data in a storing device, performing the passive distance measurement using data stored in the storing device, and performing the active distance measurement using data stored in the storing device.

Still optionally, performing the active distance measurement may include calculating a barycentric position of an object image based on the first data and the second data, and determining an object distance based on the barycentric position.

DESCRIPTION OF THE EMBODIMENTS

Hereinafter, with reference to the accompanying drawings, distance measuring devices according to first through third embodiments of the present invention will be described.

Figure 1A:
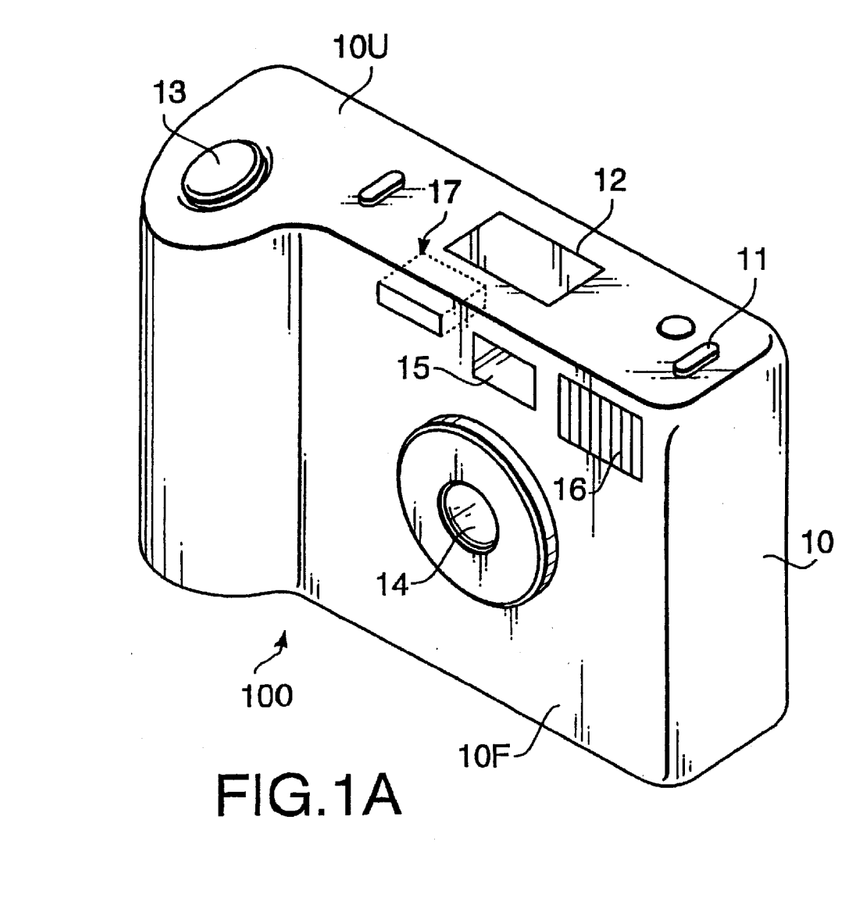
FIG. 1A Is the perspective view of Camera employing a distance measuring device according to an embodiment of the present invention.

FIG. 1A is a perspective view of a compact camera 100, to which a distance measuring device according to first, second or third embodiment of the present invention is applicable.

The camera 100 has a camera body 10. On an upper surface 10U of the camera body 10, various switches 11, and an LCD (Liquid Crystal Display) unit 12, a release button 13 are provided. On a front surface 10F of the camera body 10, a photographing lens 14 is provided. Above the photographing lens 14, on the front surface 10F, a finder window 15 is provided, and a strobe device 16 is arranged next to the finder window 15. On an opposite side of the finder window 15, a distance measuring device 17 is provided.

Figure 1B:
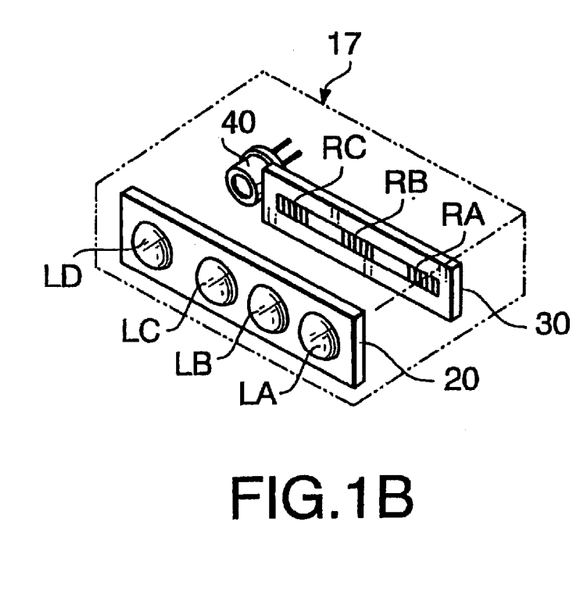
FIG. 1B schematically shows a structure of the distance measuring device.

FIG. 1B shows a structure of the distance measuring device 17. The distance measuring device 17 includes about composite lens 20 which consists of a plurality of integrally formed lenses, and a line sensor 30 which is composed of a linearly arranged CCD elements for receiving object images formed by the plurality of lenses included in the lens 20, respectively. The distance measuring device 17 is also provided with an LED (Light Emitting Diode) 40 which emits auxiliary light toward an object to illuminate the same.

Figure 2:
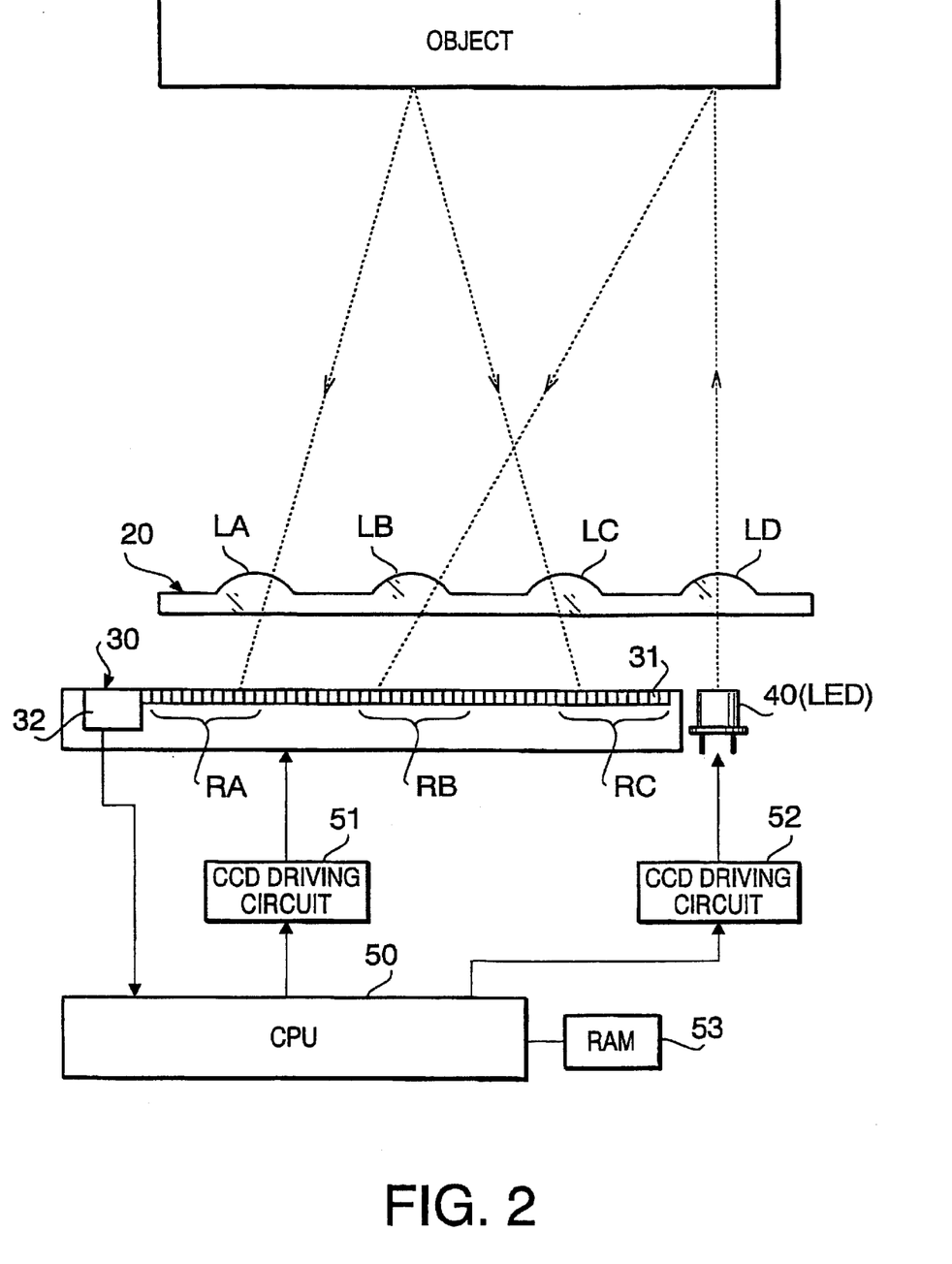
FIG. 2 schematically shows a plan view of the distance measuring device shown in FIG. 1.

FIG. 2 is a plan view of the distance measuring device 17. In FIG. 2, an arrangement of the lens 20, the line sensors 30 and the LED 40 is shown. The line sensor 30 has a light receiving unit 31 which includes a linearly arranged CCD elements including a plurality of light receiving elements arranged in a line. The light receiving unit 31 receives light, photoelectric conversion is performed by the light receiving elements (photo diodes), and accumulates electrical charges. The accumulated electrical charges are transferred so as to be output by an output unit 32 as a voltage signal.

By detecting the voltage signal output from the output unit 32, the intensity of light received by the light receiving unit 31 is detected. An entire length of the line sensor 30, or the light receiving units is divided into three areas, including a central area and both side areas.

Hereinafter, the three areas are referred to, from one direction to another, as light receiving sensors RA, RB and RC (see FIG. 2), the sensor RB being the central area. The composite lens 20 includes lens portions LA, LB and LC which correspond to the light receiving sensors RA, RB and RC, respectively. Further, the composite lens 20 further includes a collective lens portion LD which corresponds to the LED. The lenses LA–LD, which are integrally formed, are arranged in a horizontal direction at predetermined intervals therebetween. The composite lens 20 may be formed, for example, by molding transparent synthetic resin in one piece.

As shown in FIG. 2, the line sensor 30 is connected to a CPU 50 through a CCD driving circuit 51. An output signal from the output unit 32 of the line sensor 30 is transmitted to the CPU 50. The LED 40 is connected to the CPU 50 through an LED driving circuit 52. When a distance measurement is performed, the CPU 50 receives the outputs from the line sensor 30 with or without driving the LED 40, and performs a calculation for determining an object distance.

Further, the CPU 50 is connected with a RAM 53, which is capable of storing the outputs of the light receiving sensors RA, RB and RC.

Figure 3:
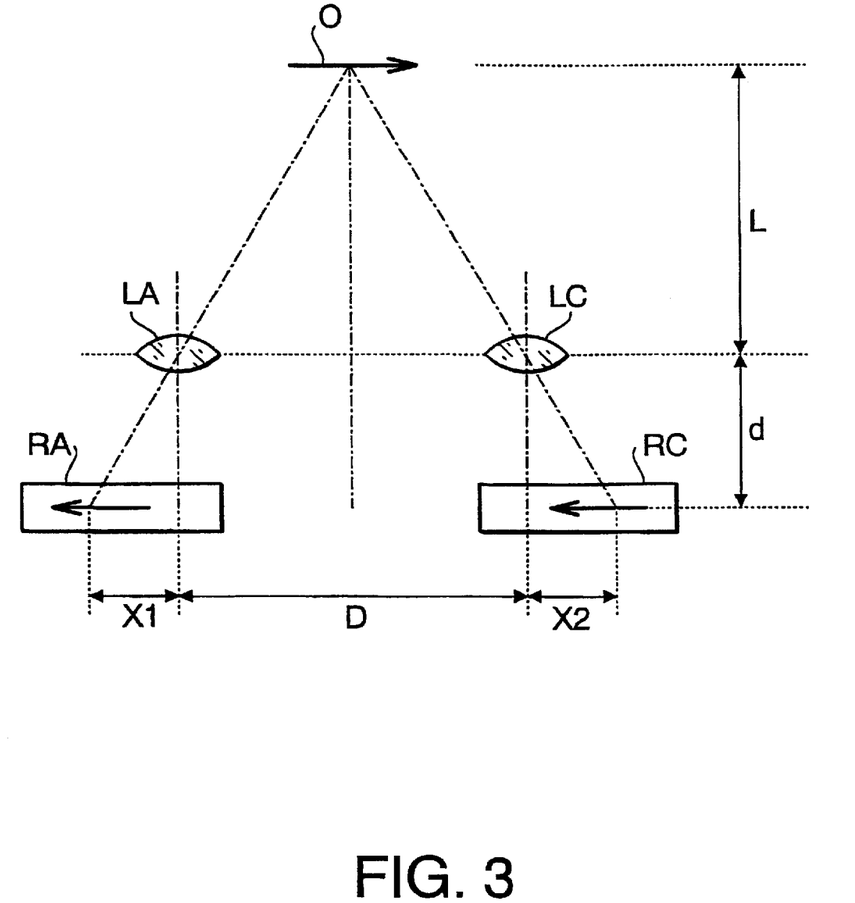
FIG. 3 is a diagram illustrating a principle of the passive distance measuring method.

The passive distance measuring operation will be briefly described. FIG. 3 shows a principle of the passive distance measuring method. By the lenses LA and LC, images of an object O are formed on the sensors RA and RC, respectively. Given that a distance between the optical axes of the lenses LA and LC is D, distance from the sensors RA and RC to the lenses LA and LC along the optical axes is d, and distances from the positions of the images, corresponding to a predetermined portion of the object, formed on the sensors RA and RC to the optical axes of the lens LA and LC are X1 and X2, and a distance from a reference position of the camera 100 to the object O is L, in accordance with the triangular best, the following relationship is established.

$$(L+d)/L=(D+X1+X2)/D \tag{1}$$

From equation (1), equation (2) is obtained.

$$L=(D \cdot d)/(X1+X2) \tag{2}$$

Figure 4:
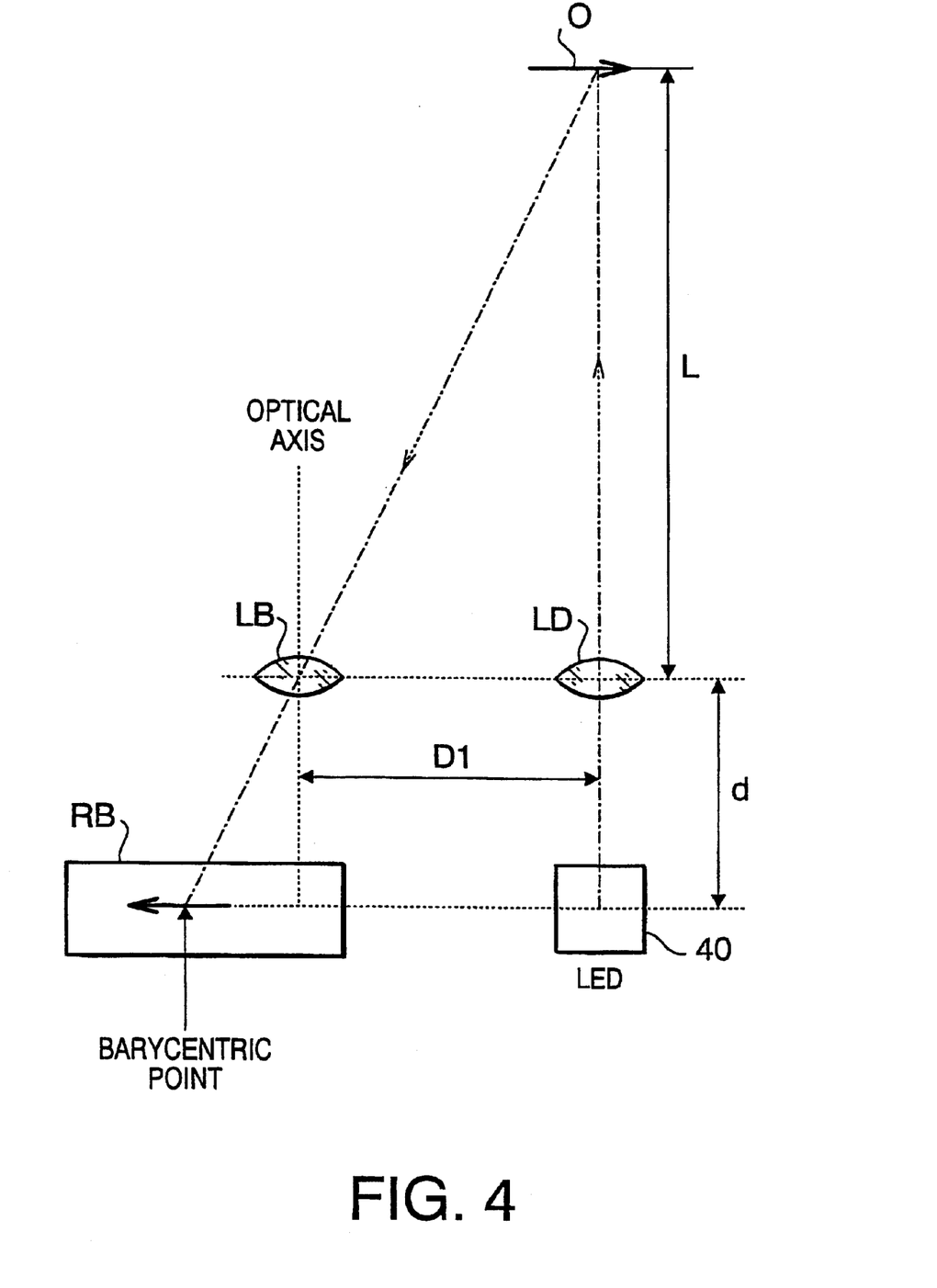
FIG. 4 is a diagram illustrating a principle of the active distance measuring method.

FIG. 4 shows the principle of the active distance measuring method. According to the active distance measuring method, the LED 40 is driven to emit light, which is collected by a collective lens LD and directed to the object O. Then, diffuse-reflected light from the object O is converged onto the sensor RB through the lens LB. By the sensor RB, the barycentric point of an object image is detected. The barycentric point is defined as follows. A point at which the intensity of light received by a CCD element, among a plurality of CCD element included in the sensor RB, is the highest is detected. That is, the central axis of the diffuse-reflected light from the object O is detected, and thus detected central axis of the diffuse-reflected light is referred to as the barycentric point. Given that the object distances is L, the distance from the LED 40 to the optical axis of the lens LB is D1, a distance from the lens LB and the sensor RB is d, and a distance from the barycenter of the object image to the optical axis of the lens LB is X3, equation (3) is established.

$$(L+d)/L=(D1+X3)/D1 \quad (3)$$

From equation (3), equation (4) can be obtained.

$$L=(D1 \cdot d)/X3 \quad (5)$$

In the active distance measuring method, when the barycentral position of the object image is determined, using the output of the sensor RB when the LED 40 does not emit light as the reference output, the output of the sensor RB when the LED 40 emits the light is modified so as to determine an accurate barycentric position of the object image. By using the reference output, the barycentric position of the object image is less effected by the external light.

Figure 5A:
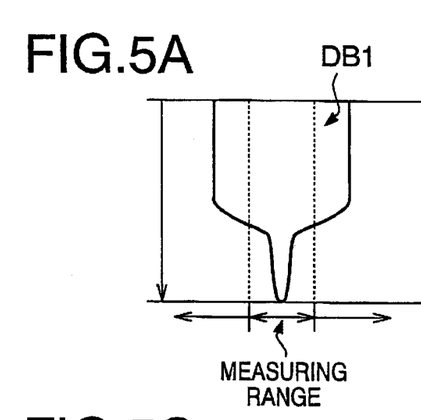
FIGS. 5A–5G show characteristics of outputs of a sensor to illustrate determination of the barycentric position when the active distance measurement is executed.
Figure 5B:
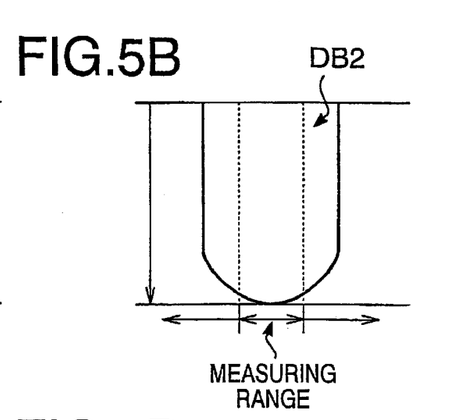

FIG. 5A shows an example of the amplitude of the output from the sensor RB, when the LED 40 emits the light. The light reflected by the object corresponds to a protruded curve within a distance measuring range indicated in FIG. 5A. The other portion of the characteristic corresponds to the external light. In order to obtain as great output as possible, the integration period of the CCD is adjusted. In this condition, when the light from the object is received without the light emission from the LED 40, the output of the sensor RB may be as shown in FIG. 5B. It should be noted that the output of the sensor RB is not saturated.

Next, the characteristics DB1 and DB2 are stored in the RAM. Thereafter, an averaged amplitude of the output level at a predetermined number (e.g., 10) of CCD elements outside the distance measuring range of each of the characteristics DB1 and DB2 is calculated (see FIGS. 5C and 5D).

Figure 5C:
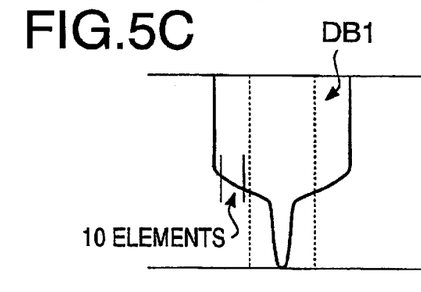
Figure 5D:
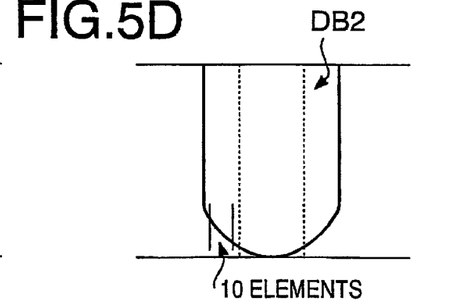
Figure 5E:
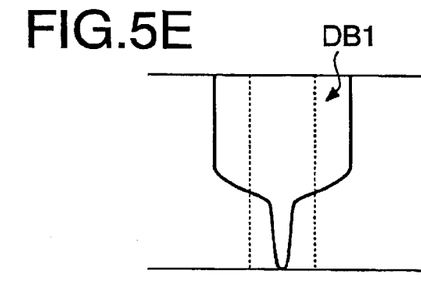
Figure 5F:
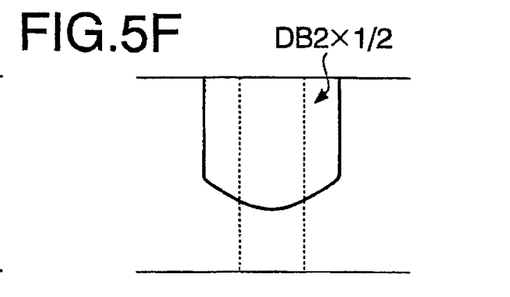
Figure 5G:
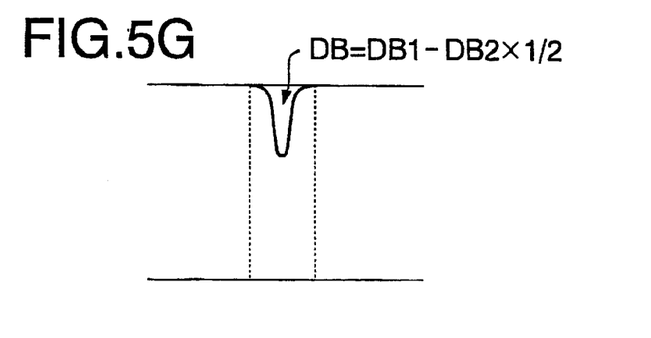

Based on the calculated averaged values, the characteristic DB2 is modified so as to corresponds to the external light component of the characteristic DB1. Specifically, if the averaged amplitude Av1 of the characteristic DB1 and the averaged amplitude Av2 of the characteristic DB2 has the following relationship:

$$Av1:Av2=1:2,$$

then, by multiplying the amplitude of the characteristic DB2 with 1/2 (see FIGS. 5E and 5F), the substantial effects of the external light on the characteristic DB2 is calculated. Then, by subtracting the characteristic shown in FIG. 5F from the characteristic shown in FIG. 5E, the external light component is cancelled, and the characteristic DB (see FIG. 5G) representing only the LED light component can be obtained. The peak of the LED light component characteristic DB is defined as the barycentric position of the object image.

The distance measuring methods, according to first through third embodiments, which can be employed in the distance measuring device performing the above-described passive distance measurement and the active distance measurement will be described in detail.

FIRST EMBODIMENT

Figure 6:
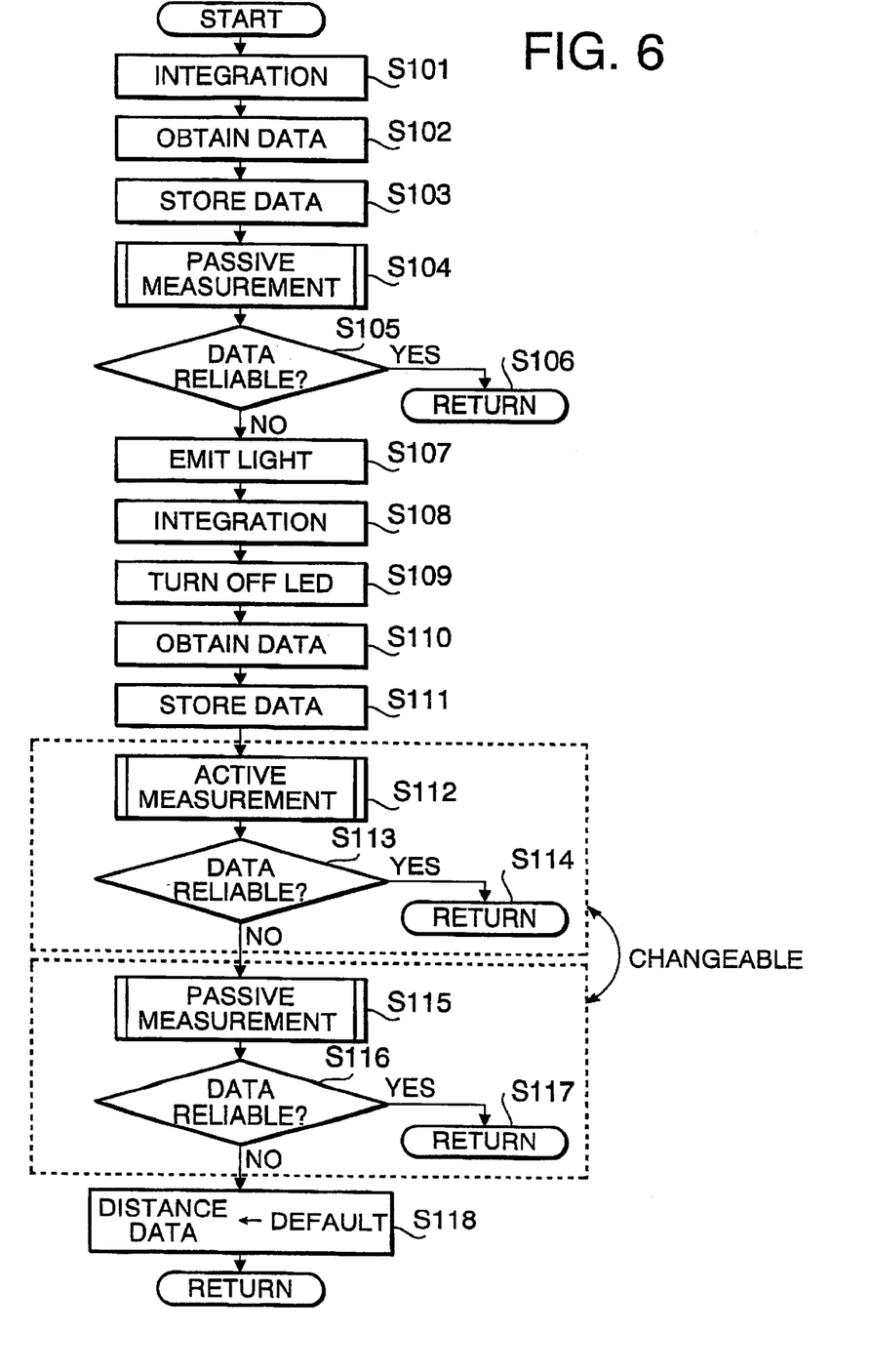
FIG. 6 is a flowchart illustrating a distance measuring procedure according to a first embodiment of the invention.

FIG. 6 is a flowchart illustrating the distance measurement procedure according to the first embodiment of the invention.

When the shutter button 13 is depressed halfway, a command for executing the distance measurement is input to the CPU 50. Upon receipt of the command, the CPU 50 controls the CCD drive circuit 51 so that the line sensor 30 starts integration (i.e., starts photoelectric-conversion and accumulating electrical charges). When a predetermined integration period has elapsed, the CPU 50 controls the CCD drive circuit 51 to terminate the integration, and the line sensor 30 stops the integration (S101). The electrical charges accumulated in the light receiving sensors RA, RB and RC of the line sensor 30, are transferred synchronously with a clock signal, and output from the output unit 32, as CCD data, in the form of an A/D converted current or voltage (S102), which is received by the CPU 50. The CCD data thus received by the CPU 50 is stored in the RAM 53 as received light data DA2, DB2 and DC2 respectively corresponding to the sensors RA, RB and RC, when the light is not emitted from the LED 40 (S103). Then, the CPU 50 reads the received light data DA2 and DC2 from the RAM 53, and based on the data, the passive distance measuring calculation, which is described before, is performed to calculate the distance data representative of the distance to the object (S104). The passive distance measuring calculation at S104 will be referred to as a first passive distance measuring calculation.

Then, reliability of the obtained distance data is examined (S105). An exemplary method for evaluating the reliability of the object distance is described in United Kingdom Patent application GB 2344012 A, teachings of which are incorporated herein by reference. If it is judged that the distance measurement data is reliable, the distance measurement data is adopted, and the distance measuring procedure shown in FIG. 6 is terminated (S106). If it is judged that the distance measurement data is not reliable, a re-execution command is issued. Then, the CPU 50 controls the LED driving circuit 52 so that the LED 40 emits light toward the object (S107). Then, the CPU 50 drives the CCD drive circuit 51 to perform the integration (S108). After an integration period has passed, the CPU 50 stops the light emission of the LED 40 (S109). The signals output from the output unit 32 (S110), which correspond to the light emitted by the LED 40 and reflected by the object, and integrated by the sensors RA, RB and RC, are stored in the RAM 53 as received light data DA1, DB1 and DC1 (S111).

Then, a distance measuring calculation is executed (S112) based on data DB1 and DB2, i.e., the received light data when the LED 40 emits light (DB1) and when the LED 40 does not (DB2), among the data stored in the RAM 53. It should be noted that the process at S112 is the active distance measuring process.

Figure 9:
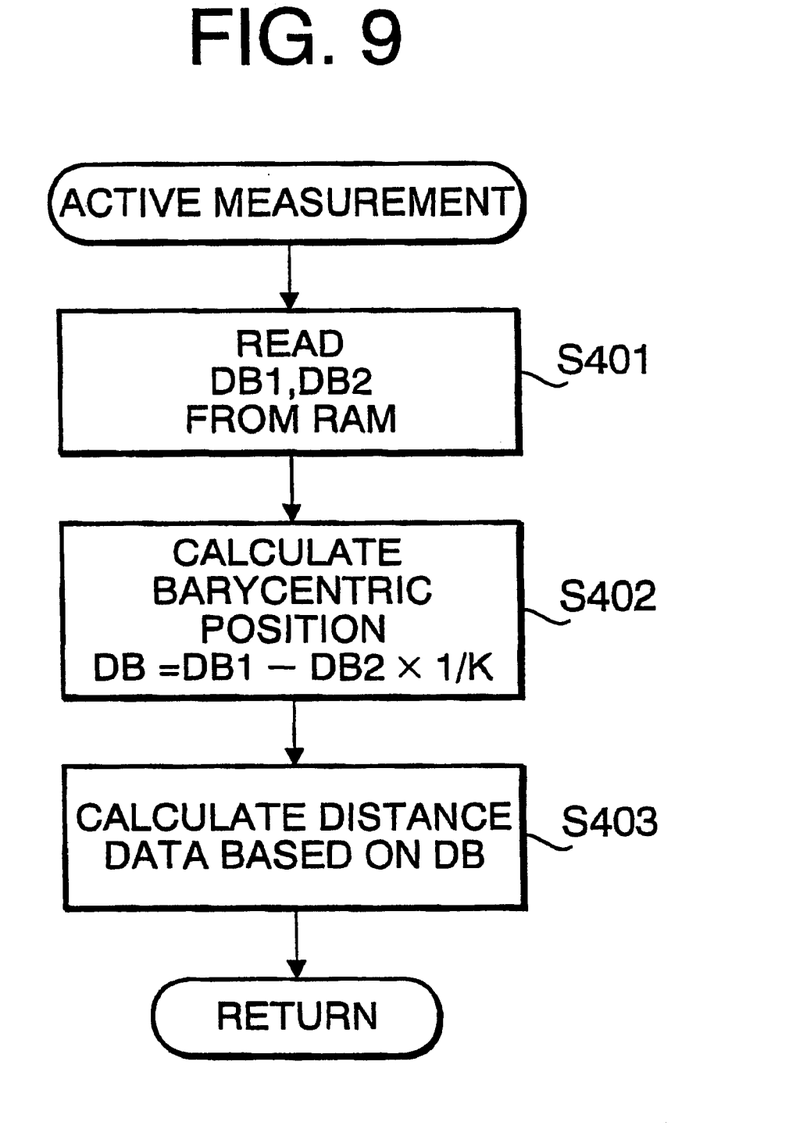
FIG. 9 is a flowchart illustrating a distance measuring calculation procedure.

FIG. 9 shows a flowchart of the distance measuring calculation. In S401, the data DB1 and DB2 is retrieved from the RAM 53. Then, based on the data DB1 and DB2, the barycentric position of the object image is determined as described above referring to FIGS. 5A–5G. Specifically, in order to obtain data DB representing the barycentric position, calculation using the following equation is performed (S402).

$$DB=DB1-DB2 \times 1/K$$

where, 1/K represents a ratio of the output (Av1) when the light is emitted from the LED 40 to the output (Av2) when the light is not emitted by the LED 40.

Then, the barycentric position is determined based on the data DB, and a calculation for the active distance measuring is performed (S403).

With reference to FIG. 9, after the active distance measuring has been executed and an object distance data is determined, the reliability of the thus determined distance data is judged (S113). If it is judged that the calculated distance data is reliable (S113: YES), the distance data is adopted, and the distance measuring procedure is terminated (S114). If it is judged that the calculated data is not reliable (S113: NO), data DA1 and DC1, which correspond to the outputs of the sensors RA and RC when the light is emitted, and a calculation of the passive distance measuring is performed (S115).

The data DA1 and DC1 for the second passive distance measuring calculation is the data corresponding to the outputs of the sensors RA and RC when the light is emitted by the LED 40 and reflected by the object. Therefore, if the contrast of the object is relatively low, the second passive distance measuring operation is advantageous in comparison with the first passive distance measuring operation in which the object is not illuminated by the light emitted by the LED 40. The reliability of the thus obtained data is judged (S116), and if the data is judged to be reliable (S116: YES), the data is adopted, and the procedure is terminated (S117). If it is judged that the data is not reliable (S116: NO), the distance data is set to a predetermined default value (S118). The default value is typically 2 m or 3 m. It is because, the object is typically located in a range of 2 through 3 m, and therefore, using such a default value, in association with the depth of field of the photographing lens, an in-focus image of the object may likely be photographed.

As described above, in the distance measuring method according to the first embodiment, if a reliable distance data is obtained using the first passive distance measurement, the distance measuring operation is terminated immediately. If the first passive distance measuring method does not provide a reliable distance data, the active distance measuring operation is performed to obtain distance data which would be reliable. Further, if the active distance measurement fails to provide are liable distance data, the second passive distance measurement is executed to obtain the distance data which could be highly reliable.

As described above, the received light data when the light is emitted by the LED and when the light is not emitted by the LED is once stored in the RAM, and then, with reference to the stored data, the distance calculation operations are performed. Therefore, even though the first and second passive distance measurements and the active distance measurement are performed, the number of steps for obtaining the received light data and stored the same in the RAM is two at the greatest. That is, according to the first embodiment, the number of steps for obtaining the object distance can be reduced and the period of time required for obtaining the object distance can be reduced.

The invention is not limited to the above-described procedure, and can be modified appropriately without leaving the scope of the invention. For example, the order of the active distance measurement in S112–S114 and the second passive distance measurement in S115–S117 can be changed.

SECOND EMBODIMENT

Figure 7:
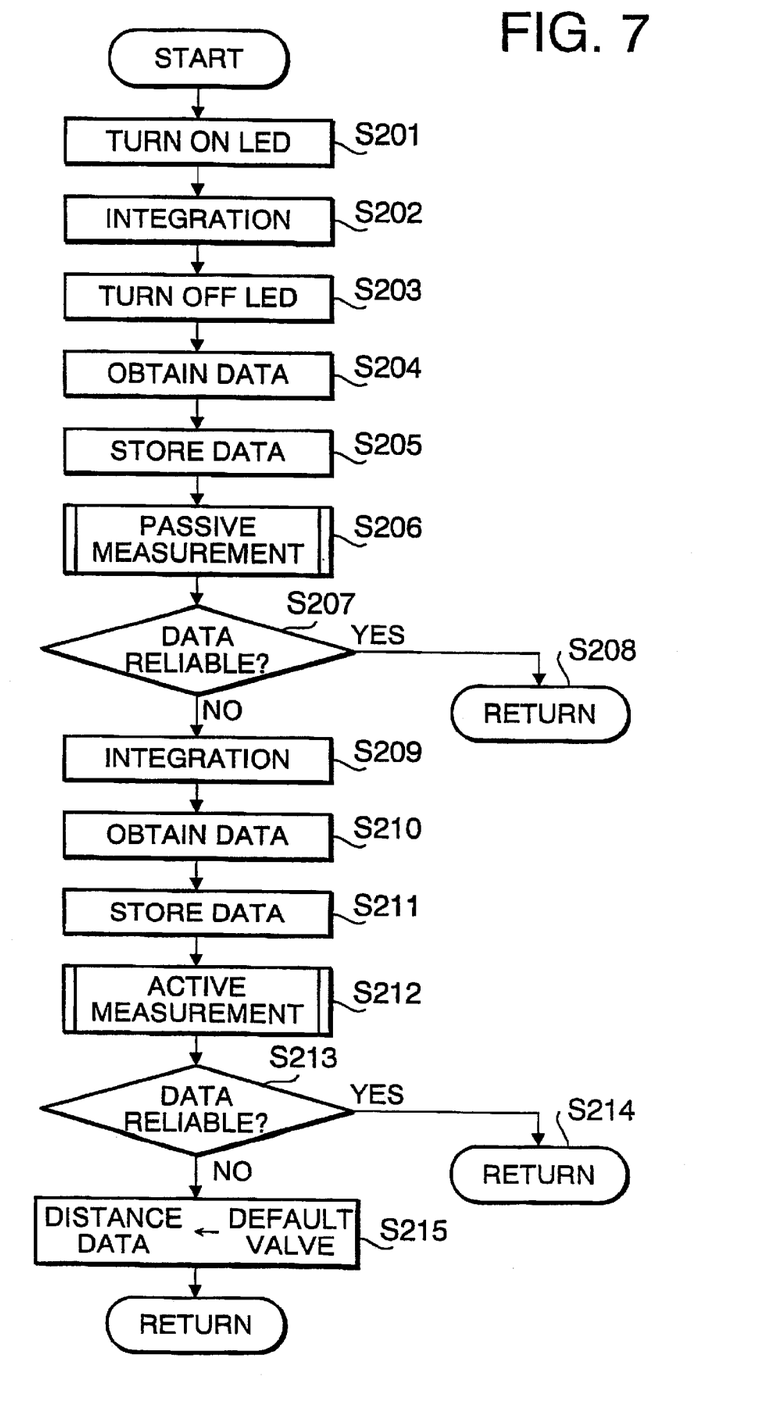
FIG. 7 is a flowchart illustrating a distance measuring procedure according to a second embodiment of the invention.

FIG. 7 is a flowchart illustrating a distance measurement according to a second embodiment of the invention. When a command for initiating the distance measurement is input to the CPU 50, the CPU 50 drives the LED drive circuit 52 so that the LED 40 emits light toward the object (S201). Then, the CPU 50 drives the CCD driving circuit 51 such that the line sensor 30 performs the integration (S202). After the integration by the line sensor 30, the CPU 50 controls the LED drive circuit 52 to stop light emission of the LED 40 (S203).

The received light data DA1, DB1 and DC1 respectively output (S204) by the sensors RA, RB and RC are stored in the RAM 53 (S205). Then, the CPU 50 retrieves received light data DA1 and DC1 from the RAM 53, and executes the passive distance measurement calculation, which has been described referring to FIG. 3, to determine an object distance (S206). It should be noted that the passive distance measurement at S206 utilizes the auxiliary light emitted by the LED 30.

Then, a reliability of the distance data thus obtained is determined (S207). If the distance data is judged to be reliable (S207: YES), the distance data is adopted, and the procedure is terminated (S208). If it is judged that the distance data is not reliable (S207: NO), another command for re-executing the distance measurement is issued. In such a case, the CPU 50 drives the line sensor 30 to perform the integration, without driving the LED 40 to emit light (S209), and obtains received light data DA2, DB2 and DC2 from the sensors RA, RB and RC, respectively, when the light is not emitted from the LED 40 to the object (S210). The obtained data DA2, DB2 and DC2 are stored in the RAM 53 (S211).

Next, based on the data output by the sensor RB and stored in the RAM 53, i.e., data DB1 when the light is emitted and data DB2 when the light is not emitted, the active distance measurement as described above with reference to FIG. 4 is executed (S212). The operation of the active distance measurement is similar to that shown in FIG. 9. Then, the reliability of the calculated distance data is judged (S213). If it is judged that the distance data is reliable (S213: YES), the distance data is adopted, and the distance measuring operation is terminated (S214). If it is judged that the distance data is not reliable (S213: NO), the distance data is set to a predetermined default value (S215).

As described above, according to the second embodiment, if the reliable distance data is obtained by the passive distance measurement, the distance measuring operation is immediately terminated. If a reliable distance data cannot be obtained by the passive distance measurement, the active distance measurement is performed. It should be noted that even if the passive and active distance measurement operations are performed, data is output and stored in the RAM twice at the greatest. Thus, also in the second embodiment, the number of the measurements is suppressed, and the period of time required for obtaining the object distance can be reduced.

THIRD EMBODIMENT

Figure 8:
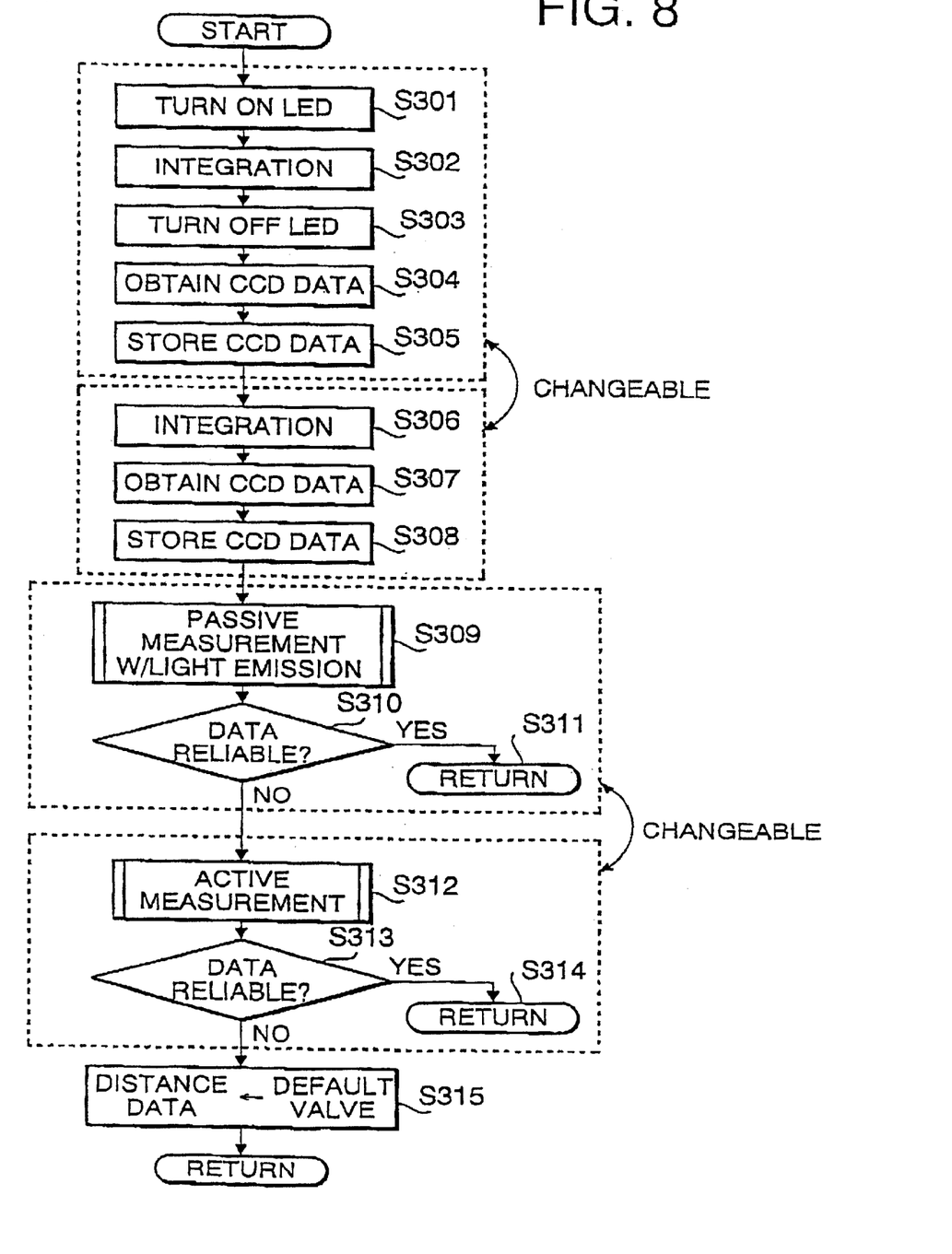
FIG. 8 is a flowchart illustrating a distance measuring procedure according to a third embodiment of the invention.

FIG. 8 is a flowchart illustrating a distance measurement procedure according to the third embodiment. When a command for initiating the distance measurement is input to the CPU 50, the CPU 50 drives the LED drive circuit 52 so that the LED 40 emits light toward the object (S301). Then, the CPU 50 drives the CCD driving circuit 51 to start integration, thereby the line sensor 30 starts integration, which is terminated upon receipt of a command to stop integration (S302). Then, the LED drive circuit 52 is controlled to stop light emission of the LED 40 (S303).

The received light data DA1, DB1 and DC1 respectively output by the sensors RA, RB and RC are stored in the RAM 53 (S304, S305). Then, another command for re-executing the distance measurement is issued, and the CPU 50 drives the line sensor 30, without driving the LED 40 to emit light (S306), and obtains received light data DA2, DB2 and DC2 when the light is not emitted to the object (S307). The obtained data DA2, DB2 and DC2 are stored in the RAM 53 (S308).

Then, the CPU 50 retrieves received light data DA1 and DC1 from the RAM 53, and executes the passive distance measurement calculation, which has been described referring to FIG. 3, to determine an object distance (S309). Then, a reliability of the distance data thus obtained is determined (S310). If the distance data is judged to be reliable (S310: YES), the distance data is adopted, and the procedure is terminated (S311).

If it is judged that the distance data is not reliable (S310: NO), based on the data output by the sensor RB and stored in the RAM 53, i.e., data DB1 when the light is emitted and data DB2 when the light is not emitted, the active distance measurement as described above with reference to FIG. 4 is executed (S312). The operation of the active distance measurement is similar to that shown in FIG. 9. Then, the reliability of the calculated data is judged (S313). If it is judged that the distance data is reliable, the distance data is adopted, and the distance measuring operation is terminated (S314). If it is judged that the distance data is not reliable (S313: NO), the distance data is set to a predetermined default value (S315).

According to the third embodiment, the outputs of the sensors when the light is emitted by the LED and when the light is not emitted are obtained and stored in the RAM 53 in advance, and the passive and active distance measuring operation can be performed arbitrarily thereafter. If a reliable distance data can be obtained by one of the active and passive distance measurement operations, the distance measurement operation can be terminated immediately. Further, since both the active and passive distance measurements are performed, the possibility of obtaining the accurate object distance becomes relatively high.

Further, similarly to the first and second embodiments, the number of steps for obtaining the received light data and store the same in the RAM can be minimized, and the period of time required for determining the object distance can be reduced.

In the third embodiment, it is possible to change the order of the steps S301–S305 and the steps S306–S308 both for obtaining and storing the received light data. Further, the order of the passive distance measurement (S309–S311) and the active distance measurement (S312–S314) can also be replaced. Furthermore, the procedure can be modified such that steps S309–S311 are executed based on the received light data when the light is not emitted by the LED 40. Alternatively, the data to be used is determined in accordance with the brightness of the object.

In the above-described embodiments, the passive sensor and the active sensor are composed of a single line sensor having CCD elements. However, this can be modified such that each of the sensors RA, RB and RC has an independent CCD array or a CCD line sensor. If each sensor is independent from the other, it is not necessary to arrange the sensors in a line, but can be arranged in any suitable manner, for example, in two lines. Optionally, if the sensors are independent from each other, the sensors may be driven synchronously.

Further, in such a case, the lenses may also be provided independently, and may be arranged corresponding to the arrangement of the sensors.

It should be noted that the distance measuring device according to the present invention can be applied not only to cameras using silver-salt films, but can also be applied to digital cameras, video cameras and the like.

Further, if the distance measuring device according to the present invention is used in combination with an AF (auto focusing) device, an accurate control of a focusing lens can be achieved.

As described above, according to the present invention, an object is metered, with and without light emission toward the object, twice at the greatest, and the obtained data is stored. Thereafter, based on the stored data, the passive distance measurement and the active distance measurement are performed. Therefore, even if both the passive and active distance measurements are performed, the number of steps for obtaining and storing the data can be limited to two at the greatest. Further, regardless of the limited number of metering operations, an accurate object distance can be obtained, and the period of time required for determining the object distance can be reduced.

The present disclosure relates to the subject matter contained in Japanese Patent Application No. 2000-131939, filed on May 1, 2000, which is expressly incorporated herein by reference in its entirety.

What is claimed is:

1. A distance measuring method, comprising:

obtaining first data corresponding to light reflected by an object when a predetermined light source is operating in a first emission mode;

performing a first distance measurement based upon the first data;

obtaining second data corresponding to light reflected by an object when the predetermined light source is operating in a second emission mode, when the first data is determined to be unreliable;

performing a second active distance measurement based on the second data; and re-performing the first distance measurement based upon the first data and the second data, when the second data is determined to be unreliable.

2. The distance measuring method of claim 1, further comprising:

storing the first data and the second data in a storing device.

3. The distance measuring method of claim 2, further comprising:

reading the first data and the second data from the storing device to perform the first distance measurement and the second distance measurement.

4. The distance measuring method of claim 1, wherein performing the second distance measurement comprises:

calculating a barycentric position of an object image based on the second data; and determining an object distance based on the barycentric position.

5. A distance measuring method, comprising:

obtaining first data corresponding to light reflected by an object when a predetermined light source operates in a first emission mode;

performing a first distance measurement based upon the first data;

obtaining second data corresponding to light reflected by an object when the predetermined light source operates in a second emission mode, when the first data is determined to be unreliable;

performing a second distance measurement based on the second data; and using a predetermined default value as a distance data when the second data is determined to be unreliable, wherein obtaining first data comprises obtaining first data corresponding to light reflected by the object when the predetermined light source emits light, obtaining second data comprises obtaining second data corresponding to light reflected by the object when the predetermined light source does not emit light, performing the first distance measurement comprises performing a passive distance measurement, and performing the second distance measurement comprises performing an active distance measurement.

6. The distance measuring method of claim 5, further comprising:

storing the first data and the second data in a storing device.

7. The distance measuring method of claim 6, further comprising:

reading the first data and the second data from the storing device to perform the first distance measurement and the second distance measurement.

8. The distance measuring method of claim 5, wherein performing the second distance measurement comprises:

calculating a barycentric position of an object image based on the second data; and determining an object distance based on the barycentric position.

9. A distance measuring method, comprising:

obtaining first data corresponding to light reflected by an object when a predetermined light source operates in a first emission mode;

obtaining second data corresponding to light reflected by the object when the predetermined light source operates in a second emission mode;

performing a first distance measurement based upon the first data;

performing a second active distance measurement when a distance data obtained by the first measurement is determined to be unreliable; and using a predetermined default value as the distance data when the distance data obtained by the second distance measurement is determined to be unreliable, wherein obtaining first data comprises obtaining first data corresponding to light reflected by the object when the predetermined light source emits light, obtaining second data comprises obtaining second data corresponding to light reflected by the object when the predetermined light source does not emit light, performing the first distance measurement comprises performing a passive distance measurement, and performing the second distance measurement comprises performing an active distance measurement.

10. The distance measuring method of claim 9, further comprising:

storing the first data and the second data in a storing device.

11. The distance measuring method of claim 10, further comprising:

reading the first data and the second data from the storing device to perform the first distance measurement and the second distance measurement.

12. The distance measuring method of claim 9, wherein performing the second distance measurement comprises:

calculating a barycentric position of an object image based on the second data; and determining an object distance based on the barycentric position.

13. The distance measuring method of claim 1, wherein obtaining first data comprises obtaining first data corresponding to light reflected by an object when the light source does not emit light, and wherein obtaining second data comprises obtaining second data corresponding to light reflected from the object when the light source emits light.

14. The distance measuring method of claim 13, wherein performing the first distance measurement comprises performing a passive distance measurement; and wherein performing the second distance measurement comprises performing an active distance measurement.

* * * * *